United States Patent
Aberle et al.

(10) Patent No.: US 11,549,578 B2
(45) Date of Patent: Jan. 10, 2023

(54) HELICAL GEAR PAIRING FOR A HELICAL GEAR UNIT, PAIRING AND USE THEREOF

(71) Applicant: IMS Gear SE & Co. KGaA, Donaueschingen (DE)

(72) Inventors: Steffen Aberle, Königsfeld (DE); Egor Melnikov, Titisee-Neustadt (DE); Jens Fechler, Hüfingen (DE)

(73) Assignee: IMS Gear SE & Co. KGaA, Donaueschingen (DE)

( * ) Notice: Subject to any disclaimer, the term of this patent is extended or adjusted under 35 U.S.C. 154(b) by 34 days.

(21) Appl. No.: 15/987,642

(22) Filed: May 23, 2018

(65) Prior Publication Data
US 2018/0340603 A1  Nov. 29, 2018

(30) Foreign Application Priority Data
May 24, 2017 (EP) .................................. 17172630

(51) Int. Cl.
*F16H 55/22* (2006.01)
*F16H 55/17* (2006.01)
(Continued)

(52) U.S. Cl.
CPC .............. *F16H 55/22* (2013.01); *F16H 1/08* (2013.01); *F16H 1/16* (2013.01); *F16H 55/08* (2013.01);
(Continued)

(58) Field of Classification Search
CPC ..... F16H 1/08; F16H 1/16; F16H 1/18; F16H 55/0806; F16H 55/22; F16H 55/17
(Continued)

(56) References Cited

U.S. PATENT DOCUMENTS

| 1,772,688 A | * | 8/1930 | Roano .................. F16H 1/08 74/466 |
| 1,861,258 A | | 5/1932 | Bethune |

(Continued)

FOREIGN PATENT DOCUMENTS

| CN | 103998822 | 8/2014 |
| CN | 105156637 | 12/2015 |

(Continued)

OTHER PUBLICATIONS

DE 2446172 (Paul Kluwe) Apr. 15, 1976. [online] [retrieved on Jan. 2, 2021], Retrieved from ProQuest Dialog. (Year: 1976).*

(Continued)

*Primary Examiner* — Joseph Brown
(74) *Attorney, Agent, or Firm* — Akerman LLP; Peter A. Chiabotti

(57) ABSTRACT

A gear pairing for a helical gear unit or a spur gear unit, comprising a first gear with a first toothing portion, and a second gear with a second toothing portion, wherein the first gear has a first axis and the second gear has a second axis, which enclose a shaft angle, which is between 0 and 90°, the first toothing portion and the second toothing portion can be brought into meshing engagement and, when engaged, form an involute toothing, the materials of the first and second toothing portions are chosen so that, when engaged, a material pairing metal/plastic results, and the toothing portion made of plastic has a first helix angle and the toothing portion made of metal has a second helix angle.

6 Claims, 3 Drawing Sheets

Figure 1A:
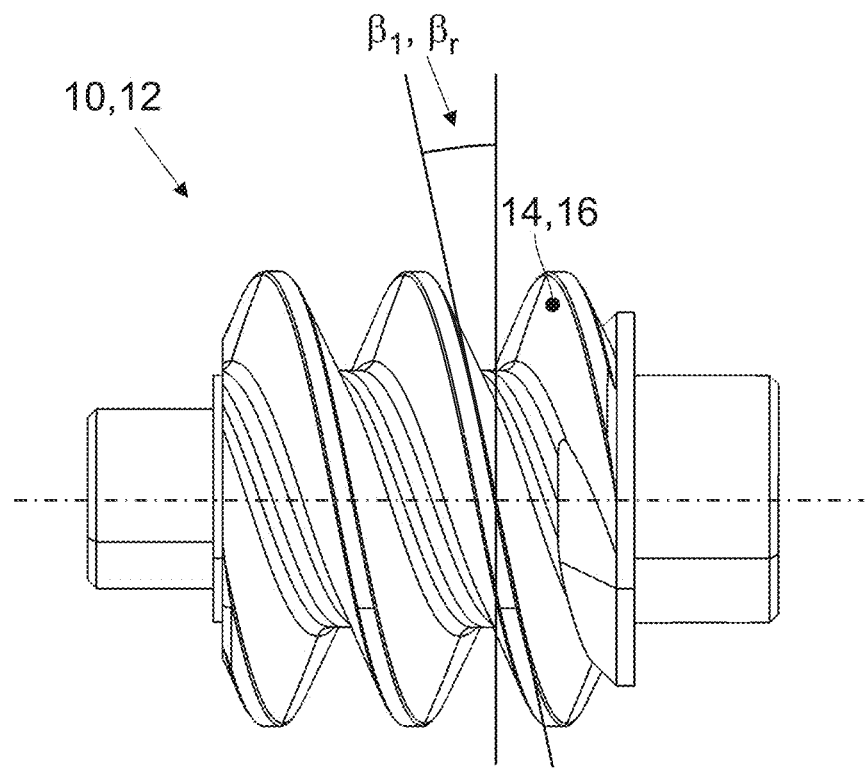

(51) Int. Cl.
*F16H 1/16* (2006.01)
*F16H 1/08* (2006.01)
*F16H 55/08* (2006.01)

(52) U.S. Cl.
CPC ......... *F16H 55/0806* (2013.01); *F16H 55/17* (2013.01)

(58) Field of Classification Search
USPC .............................. 74/424.5, 424.7, 425, 458
See application file for complete search history.

(56) References Cited

U.S. PATENT DOCUMENTS

| | | | |
|---|---|---|---|
| 3,327,548 A | 6/1967 | Welch | |
| 3,481,215 A * | 12/1969 | Howell | F16H 1/08 74/424.5 |
| 4,292,857 A * | 10/1981 | Matusz | F16H 1/08 74/409 |
| 4,890,504 A * | 1/1990 | Carrigan | F16H 55/0806 74/421 R |
| 6,029,763 A * | 2/2000 | Swisher | B60K 17/043 180/65.6 |
| 6,223,615 B1 * | 5/2001 | Huck | B60R 16/037 403/359.6 |
| 8,683,887 B2 | 4/2014 | Yamazaki | |
| 9,932,066 B2 | 4/2018 | Oberle et al. | |
| 2001/0029800 A1 * | 10/2001 | Bucholz | F16H 1/16 74/425 |
| 2006/0196295 A1 * | 9/2006 | Maeda | B23F 11/00 74/425 |
| 2006/0213302 A1 * | 9/2006 | Hoffmann | B29C 45/1671 74/425 |
| 2007/0221004 A1 * | 9/2007 | Maeda | F16H 1/16 74/425 |
| 2007/0227279 A1 * | 10/2007 | Watanabe | B62D 5/0409 74/89.14 |
| 2007/0238571 A1 * | 10/2007 | Sugitani | F16C 19/50 475/227 |
| 2007/0275640 A1 * | 11/2007 | Iwano | B23F 11/00 451/47 |
| 2008/0223163 A1 | 9/2008 | Yamazaki et al. | |
| 2008/0289436 A1 * | 11/2008 | Laakkonen | G01L 5/12 73/862.49 |
| 2009/0000120 A1 * | 1/2009 | Shiino | B23F 11/00 29/893.31 |
| 2009/0120711 A1 * | 5/2009 | Shiino | B62D 5/0406 180/443 |
| 2009/0283062 A1 * | 11/2009 | Taye | F01L 13/0021 123/90.15 |
| 2014/0311267 A1 * | 10/2014 | Figura | F16H 55/24 74/425 |
| 2014/0318289 A1 * | 10/2014 | Tanaka | B62D 5/0409 74/89.14 |
| 2015/0330495 A1 * | 11/2015 | Goetz | F16H 1/34 74/423 |
| 2016/0069423 A1 * | 3/2016 | Hamakita | B62D 5/0409 74/425 |
| 2016/0236707 A1 | 8/2016 | Oberle | |
| 2018/0029508 A1 * | 2/2018 | Carl | B60N 2/0232 |

FOREIGN PATENT DOCUMENTS

| | | | |
|---|---|---|---|
| CN | 105889419 | 8/2016 | |
| CN | 106269804 | 1/2017 | |
| DE | 2446172 A1 * | 4/1976 | ......... F16H 55/0806 |
| DE | 102014211402 | 12/2015 | |
| EP | 1731799 | 12/2006 | |
| EP | 3056767 | 8/2016 | |
| JP | 2005199776 | 7/2005 | |
| WO | WO-2007062977 A1 * | 6/2007 | .............. B60S 1/166 |

OTHER PUBLICATIONS

WO 2007062977 (Peter Klingler) Jul. 6, 2007 (Specification), [online] [retrieved on Mar. 9, 2021], Retrieved from: Patentscope Database. (Year: 2007).*

Wikipedia contributors. (Mar. 13, 2017). Involute gear. In Wikipedia, The Free Encyclopedia. Retrieved 14:58, Jan. 4, 2022, from https://en.wikipedia.org/w/index.php?title=Involute_gear&oldid=770089131 (Year: 2017).*

European Patent Office, "European Search Report," issued in European Application No. 17 172 630.0, document of 8 pages, dated Dec. 8, 2017.

First Office Action, Chinese Patent Office, Chinese Patent App. No. 201810481609, dated Nov. 3, 2020, with translation.

* cited by examiner

HELICAL GEAR PAIRING FOR A HELICAL GEAR UNIT, PAIRING AND USE THEREOF

CROSS-REFERENCE TO RELATED APPLICATIONS

This application claims priority to European Patent Application No. 17 172 630.0, filed May 24, 2017, which is incorporated by reference in its entirety.

BACKGROUND

The present application relates to gear pairing for a helical gear unit or a spur gear unit, helical gear unit or spur gear unit with such a gear pairing and use of such a gear pairing in helical gear units and spur gear units.

SUMMARY

Helical gear units, which have a gear pairing of a helical gear and a worm, are used in many applications, especially because large gear ratios can be realized in a small space. Due to this feature, helical gear units are used widely for auxiliary drives in the automotive sector, for the adjustment of two mutually adjustable vehicle parts. Since self-locking can be realized with helical gear units, no further measures are necessary in order to fix the position of the two vehicle parts relative to one another, once set.

It should be noted that helical gear units are very similar to worm gear units, which comprise a worm and a worm gear. While in helical gear units there is a punctiform contact surface with the worm at the helical gear which, under load, becomes a so-called pressure ellipse, in worm gear units there is a line contact at the worm gear due to the globoid shape of the toothing portion of the worm and/or worm gear. Due to the special shape of the toothing portion, worm gears represent a special embodiment of helical gear units. Consequently, the following statements made for helical gear units apply equally to worm gear units.

Spur gear units, which comprise at least two spur gears, are characterized by a high efficiency. For auxiliary drives in the automotive sector, where efficiency plays an important role, spur gear units are also used as an alternative to helical gear units. A particularly noteworthy embodiment of spur gear units are planetary gear units, which comprise multiple spur gears. Also, the ring gear is a spur gear, with the difference that it is internally toothed.

Examples of applications of such auxiliary drives in the automotive sector are seat-length adjustments, sliding roofs, and window regulators.

In the event that the helical gear unit and the spur gear unit feature a one stage design, they comprise a first gear and a second gear which, depending on the type of gear unit, are designed differently, as explained above.

The first gear has a first toothing portion and the second gear has a second toothing portion, which are meshingly engaged in the helical gear unit and thereby usually form an involute toothing. Involute toothings are relatively easy to manufacture since, for example, in contrast to a cycloidal toothing, they can be produced by means of an easily executable and effective hobbing process. In addition, involute toothings are relatively insensitive to wheelbase changes within certain limits as compared to a cycloid toothing, and result in a generally smoother ride.

Involute toothings are based on a standard profile which is standardized, inter alia, in DIN 867. The standard profile corresponds to the theoretical rack profile on which a corresponding gear is rolling off without backlash. In practice, it is the shape of the tool with which the respective gear is produced in the hobbing process. Involute toothings, which are based on the standard profile standardized in DIN 867, are very suitable for many applications, especially if the gear pairing is designed so that there is an engaged material pairing metal/metal.

Among other things, for reasons of simplified design, reduced weight, and a reduced noise generation, gears made of plastic are increasingly being used, in particular in the automotive sector, so that there is a material pairing plastic/plastic or metal/plastic. It has been found that known involute toothings based on the reference profile standardized in DIN 867 are suitable for material pairings metal/plastic only to a limited extent. In particular, due to the higher deformability and the greater thermal expansion of the plastic, when operating helical gear units and spur gear units incorrect engagements may occur, which lead to increased noise generation, so that one of the advantages of using the material pairing metal/plastic can only be realized partially. In addition, incorrect engagement leads to increased wear, which progresses to a greater extent in case of gears made of plastic depending on the plastic used than with gears made of metal. Also, jamming of the engaging gears can not be safely ruled out, which can lead to a malfunction of the helical gear unit or the spur gear unit.

The applicant has therefore developed an involute toothing for spur gear units and an involute toothing for helical gear units that differ from the standard profile described in DIN 867 and which are collectively referred to as "reference profile".

Usually, the axes of the drive shaft and the output shaft in helical gear units are perpendicular to one another, i.e., they enclose an angle of 90°. However, it is also possible to design helical gear units so that the angle between the drive shaft and the output shaft is less than 90°. If the angle between the drive shaft and the output shaft is 0°, the drive shaft and the output shaft are parallel to one another, which is the case with spur gear units. The two reference profiles are therefore different only in that they are adapted to the angle which the axes of the drive shaft and the output shaft enclose.

The reference profiles, which are suitable for both helical gear units and spur gear units with the appropriate adjustments, are produced in series and are therefore part of the prior art.

Although the respective reference profiles of the applicant represent a significant improvement compared to the standardized standard profile, the above-mentioned disadvantages can not be completely eliminated using the reference profile.

One embodiment of the present application provides a gear pairing for a helical gear unit or a spur gear unit, by which, at a material pairing metal/plastic, the risk of incorrect engagements between the first gear and the second gear can be reduced using an involute toothing.

An embodiment of the disclosure relates to a gear pairing for a helical gear unit or a spur gear unit, comprising a first gear with a first toothing portion, and a second gear with a second toothing portion, wherein the first gear has a first axis and the second gear has a second axis enclosing a shaft angle between 0 and 90°, the first toothing portion and the second toothing portion can be brought into meshing engagement and, when engaged, form an involute toothing, the materials of the first and second toothing portions are chosen so that, when engaged, a material pairing metal/plastic results, and the toothing portion made of plastic has a first helix angle and the toothing portion made of metal has a second helix angle. In this case, the difference ($\Delta\beta$) between the absolute value of the first helix angle ($|\beta_1|$) and the absolute value of the second helix angle ($|\beta_2|$)

is for a helical gear unit with a shaft angle ($\chi$) of 45 to 90°:
$\Delta\beta ||\beta_1|-|\beta_2||=90°-\chi\pm K\neq 90°-\chi$.

is for a helical gear unit with a shaft angle ($\chi$) of 0 to 45°:
$\Delta\beta=|\beta_1|-|\beta_2|=0°-\chi\pm K\neq 0°-\chi$, and is for a spur gear unit with a shaft angle ($\chi$) of 0°:
$\Delta\beta=|\beta_1|-|\beta_2|\oplus=0°\pm K\neq 0°$, wherein $0.5°\leq K\leq 5°$ and, in particular, $1°\leq K\leq 3°$.

In order to be able to realize the material pairing metal/plastic, the first gear must be made of metal at least in the first toothing portion, and the second gear must be made of plastic at least in the second toothing portion, or vice versa. A toothing portion is understood to mean that portion of the respective gear in which the teeth are located.

The material pairing metal/plastic relates to the engaged toothing portions so that plastic comes in contact with metal at the contact points or contact lines of the helical gear and the worm.

The reference profile defines an involute toothing and will be defined in more detail later.

If the gear pairing is used for a helical gear unit, then the first gear is formed as a worm and the second gear is formed as a helical gear.

If the gear pairing is used for a spur gear unit, then the first gear is formed as a first spur gear and the second gear is formed as a second spur gear.

An essential distinguishing feature between spur gear units and helical gear units is the shaft angle, which is enclosed by the axes of the first gear and the second gear. In a spur gear unit, the axes are parallel so that the shaft angle is 0°. For most helical gear units, the shaft angle is 90°, however, the shaft angle can be freely chosen between 0° and 90°.

In spur gears, it is not necessary to use helical toothing. However, a helical toothing has the following properties: The respective teeth of the toothing portions do not engage abruptly, but over the flank width at different times, whereby the degree of overlap with respect to spur toothing is increased. As a result, the load capacity and the smoothness are increased, which is why helical toothing is better suited for high speeds than spur toothing.

In order to enable toothing in spite of a shaft angle deviating from 0°, as is the case with helical gear units, the toothing portions must have a specific helix angle.

In spur gears according to DIN 867 and in the prior art generally, the first helix angle and the second helix angle are equal in terms of absolute value. In helical gear units where the shaft angle is between 45 and 90°, the difference between the absolute values of the first and second helix angles equals the difference of 90° and the shaft angle. In helical gear units where the shaft angle is between 0 and 45°, the difference of the absolute values of the first and second helix angles equals the difference of 0° and the shaft angle.

As proposed, the two helix angles are chosen such that the difference of their absolute values deviates by a correction value upwards or downwards from the above-mentioned provisions. It has proved favorable if the correction value is between 0.5 and 5° and in particular between 1 and 3°. In this range, the risk of incorrect engagement between the first gear and the second gear can be reduced particularly effectively.

According to a further embodiment, a reference profile has a reference helix angle, wherein the first helix angle is different from the reference helix angle and/or the second helix angle is different from the reference helix angle.

A reference profile is understood to mean a profile, which has a gear pairing, which is exactly the same as the present gear pairing except for the helix angle and the helix angle dependent quantities. However, this can cause, for example, the tip diameter to change. However, the tip diameter must remain the same regardless of the change in the helix angle, otherwise the engagement will be improper. This may make it necessary to adjust other quantities of the gear pairing. As mentioned above, the helix angle in gear pairings known from the prior art is the same in both helical gear units and spur gear units. In contrast, in this proposed embodiment, for example, the following combinations are possible:

The first helix angle is smaller than or larger than the reference helix angle, wherein the first helix angle is associated with the toothing portion made of plastic. Here it is irrelevant whether the toothing portion made of plastic is associated with the first or the second gear, as long as there is a material pairing metal/plastic when engaged.

The second helix angle is smaller than or larger than the reference helix angle, wherein the second helix angle is associated with the toothing portion made of metal. Here it is irrelevant whether the toothing portion made of metal is associated with the first or the second gear, as long as there is a material pairing metal/plastic when engaged.

The conditions of the first helix angle mentioned apply regardless of the conditions of the second helix angle mentioned. In this respect, it is possible that both helix angles are larger than the reference helix angle. Furthermore, it is possible that both helix angles are smaller than the reference helix angle. Furthermore, it is possible that one of the two helix angles is larger and the other of the two helix angles is smaller than the reference helix angle.

It is quite possible to adapt the helix angle of only one of the toothing portions and to leave the helix angle of the other toothing portion unchanged with respect to the reference profile. Consequently, one of the gears can remain unchanged, whereby the additional effort to implement the proposed gear pairing can be kept low.

In all embodiments, the quantities mentioned are changed so that an involute toothing is still formed. The above-mentioned advantages of involute toothing, in particular simple production in the hobbing process, are retained.

An embodiment of the application relates to a helical gear unit, comprising a gear pairing according to one of the embodiments discussed above, wherein the first gear is formed as a worm and the second gear is formed as a helical gear and the helical gear or the worm is connected to a drive shaft and the first toothing portion of the worm and the second toothing portion of the helical gear are meshingly engaged.

The technical effects and advantages that can be achieved with the proposed helical gear unit correspond to those that have been discussed for the present gear pairing. In summary, it should be noted that it is possible, with the proposed helical gear unit, to reduce the risk of incorrect engagement in the operation of the helical gear unit in a technically simple way. As a result, noise generation and wear are kept low.

In a further embodiment, the helical gear can be made of metal, be formed as a spindle nut and interacts with a spindle, wherein the worm can be made of plastic. In this embodiment, the helical gear unit is particularly suitable for use in seat-length adjustments of vehicles. For this purpose, the spindle nut is supported on the spindle non-rotatably mounted in the vehicle. When the spindle nut is rotated, it moves along the longitudinal axis of the spindle. This movement is used for the longitudinal adjustment of the seat in question. The design of the helical gear made of metal as a spindle nut has the following technical effect: Due to the higher strength of the metal compared to plastic, the spindle nut made of metal can transmit higher forces to the spindle, so that in case of a crash of the vehicle, the spindle nut remains engaged with the spindle, whereby an uncontrolled movement of the seat is prevented. This reduces the risk of injury to the occupant of the vehicle sitting on the seat.

In most cases, the helical gear is made entirely of metal and the worm is entirely made of plastic, or the helical gear is entirely made of plastic and the worm is entirely made of metal, with worms or helical gears being conceivable in which, for example, an insert component made of metal is provided, which is overmolded with plastic.

An implementation of the disclosure relates to a spur gear unit, comprising a gear pairing according to one of the exemplary embodiments explained above, wherein the first gear is formed as a first spur gear and the second gear is formed as a second spur gear and the first spur gear or the second spur gear is connected to a drive shaft and the first toothing portion of the first spur gear and the second toothing portion of the second spur gear are meshingly engaged.

The technical effects and advantages that can be achieved with the proposed spur gear correspond to those that have been discussed for the present gear pairing. In summary, it should be noted that it is possible, with the proposed spur gear, to reduce the risk of incorrect engagement in the operation of the spur gear in a technically simple way. As a result, noise generation and wear are kept low. In addition, it should be noted that spur gear units can be operated particularly efficiently. In addition, the helical toothing allows increased smoothness.

An application of the application relates to the use of a gear pairing according to one of the embodiments explained above in helical gear units in particular according to one of the described embodiments or in spur gears in particular according to the previously discussed implementation for auxiliary drives in vehicles, especially for seat length adjustments.

The technical effects and advantages that can be achieved with the proposed use, correspond to those that have been discussed for the present gear pairing. In summary, it should be noted that it is possible with the proposed use of the gear pairing described above in a helical gear unit or in a spur gear unit to reduce the risk of incorrect engagement in the operation of the helical gear unit in a technically simple way. As a result, noise generation and wear are kept low.

Figure 1B:
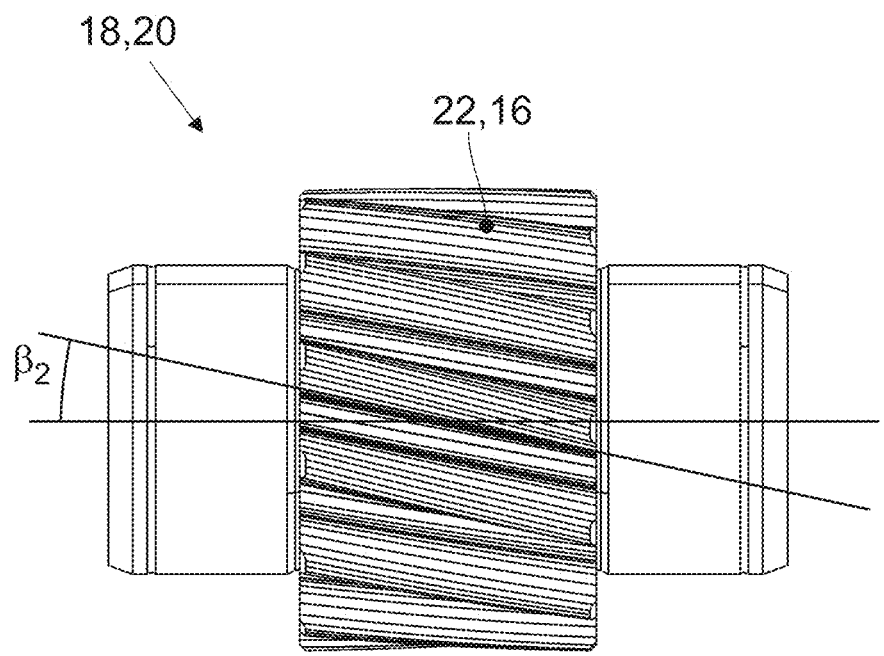
Figures 2A, 2B:
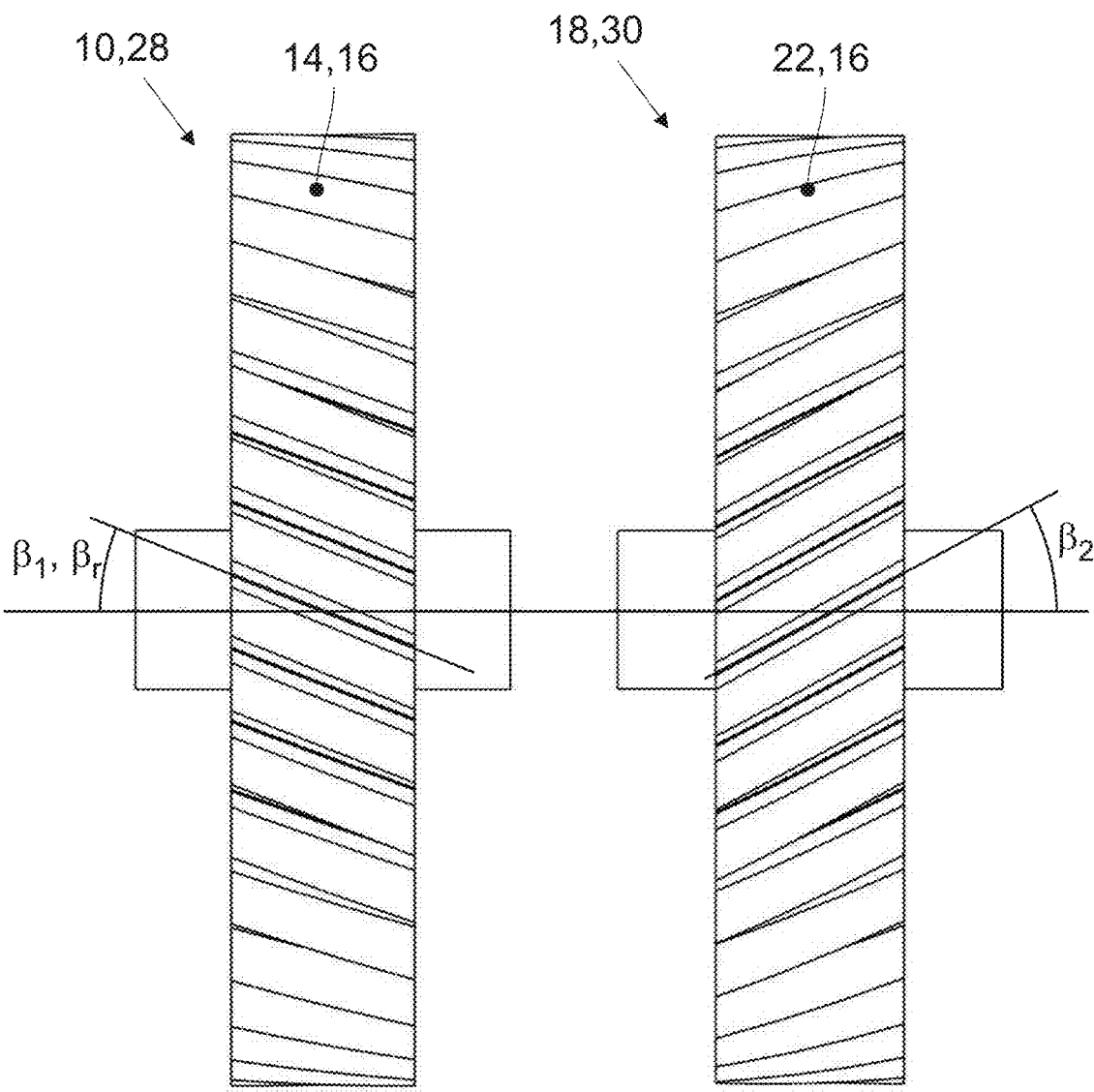
Figure 3:
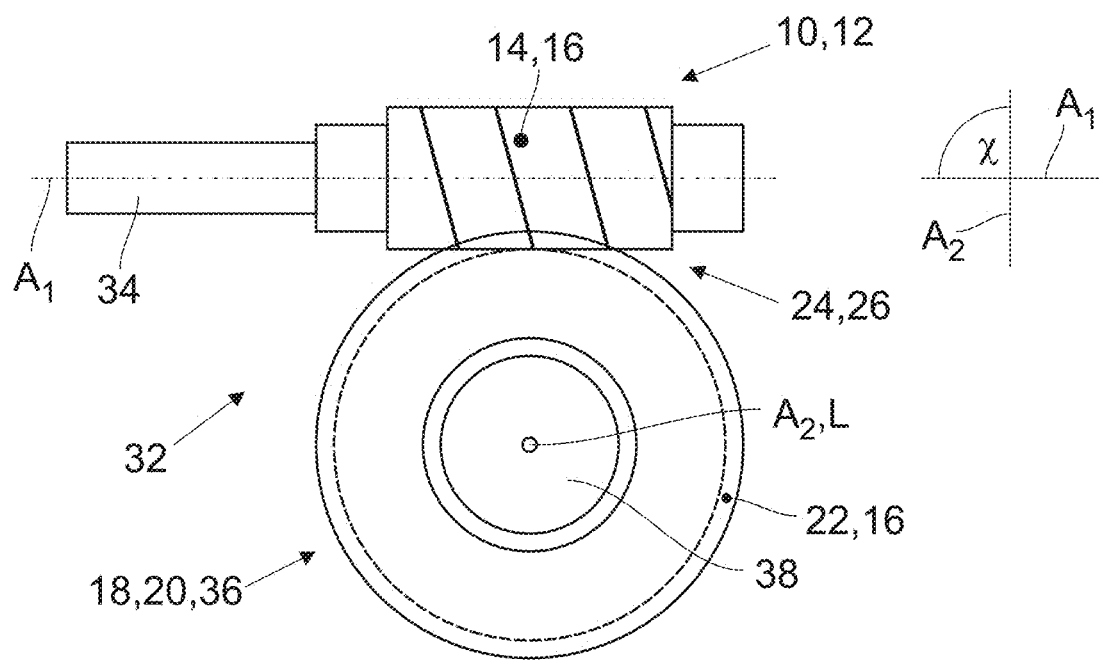
Figure 4:
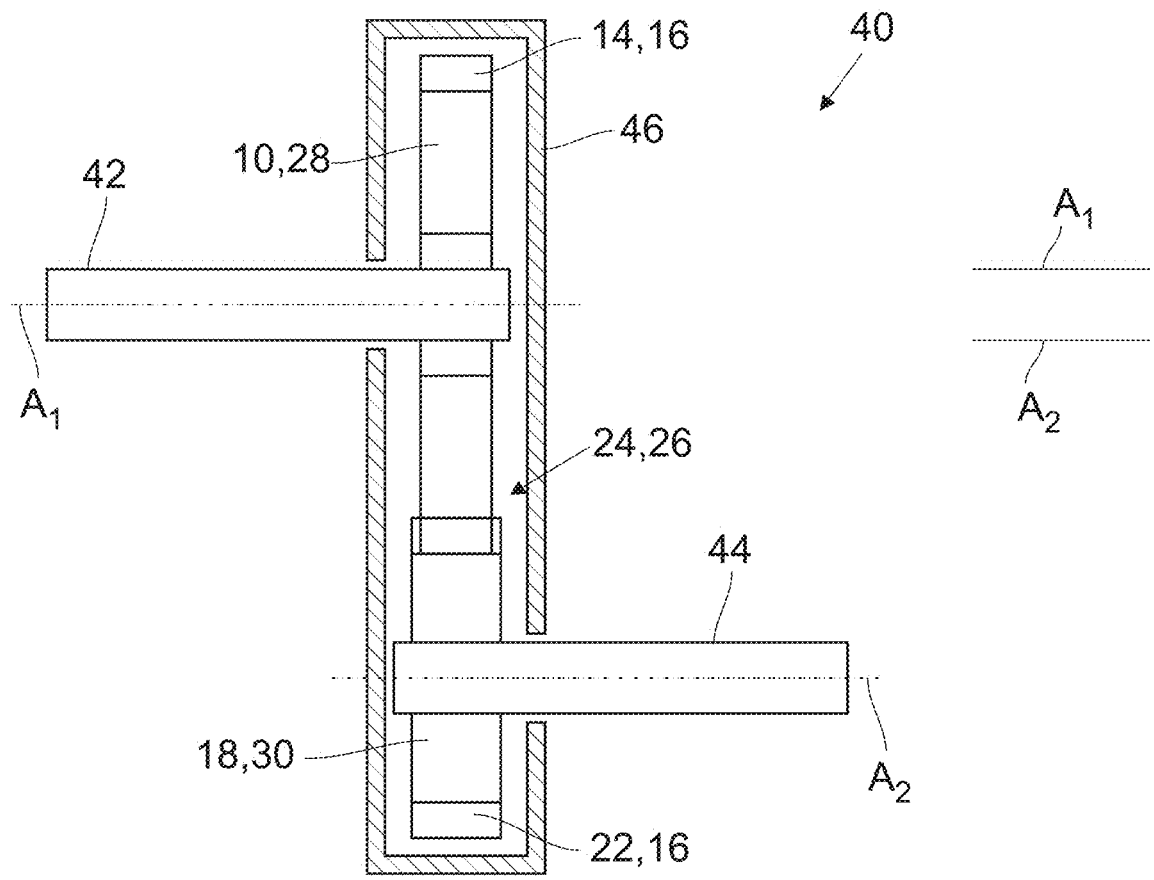

The subject matter of the present application will be explained in more detail below with reference to the accompanying drawings illustrating exemplary embodiments in which:

FIG. 1a) shows a view of a worm of a proposed gear pairing,

FIG. 1b) shows a view of a helical gear of a proposed gear pairing, wherein the worm and the helical gear can be brought into meshing engagement with one another, FIG. 2a) shows a view of a first spur gear of a proposed gear pairing, FIG. 2b) shows a view of a second spur gear of a proposed gear pairing, wherein the first spur gear and the second spur gear can be brought into meshing engagement with one another, FIG. 3 shows a schematic representation of a helical gear unit with a proposed gear pairing, and FIG. 4 shows a schematic representation of a spur gear unit with a proposed gear pairing.

FIG. 1a) shows a first gear 10 according to a first embodiment of the present application, which is configured as a worm 12 and made entirely of plastic. Worm 12 has a first toothing portion 14 within which a number of teeth 16 are located. The first toothing portion 14 has a first helix angle $\beta_1$.

FIG. 1b) shows a second gear 18 according to a first embodiment of the application. The second gear 18 is formed as a helical gear 20 and made entirely of metal. The helical gear 20 has a second toothing portion 22, within which a number of teeth 16 are located. The second toothing portion 22 has a second helix angle $\beta_2$.

As defined, below, the first helix angle $\beta_1$ is always associated with the toothing portion made of plastic and the second helix angle $\beta_2$ is associated with the toothing portion made of metal, irrespective of whether the relevant toothing portion is arranged on the first gear 10 or the second gear 18.

Worm 12 and helical gear 20 form a gear pairing 24, in which the first toothing portion 14 and the second toothing portion 22 can be brought into meshing engagement with one another and form an involute toothing 26 (see FIG. 3).

Not shown is a reference profile, which also has a worm and a helical gear, which form a gear pairing 24 (see Table 1). In the case of the reference profile, the first helix angle $\beta_1$ and the second helix angle $\beta_2$ are equal in terms of absolute value, so that they both form a reference helix angle $\beta_r$ of the same absolute value. Both the worm 12 shown in FIGS. 1a) and 1b) and the helical gear 20 shown, and the worm and the helical gear of the reference profile are designed for a helical gear unit, which forms a shaft angle $\chi$ of 90° (see FIG. 3).

In the embodiment shown in FIG. 1a), worm 12 corresponds to the worm of the reference profile, so that the first helix angle $\beta_1$ is equal to the reference helix angle $\beta_r$.

However, the second helix angle $\beta_2$ of helical gear 20 is larger than the reference helix angle $\beta_r$, so that helical gear 20 deviates from the helical gear of the reference profile. However, the deviations are limited to the second helix angle $\beta_2$ and the quantities dependent of the second helix angle $\beta_2$ in an involute toothing 26. Otherwise, helical gear 20 is constructed in the same way as helical gear 20 of the reference profile. However, to ensure a perfect engagement, especially the tip diameter must be kept constant. As a result, it may be necessary to adapt other quantities that are not dependent on the second helix angle $\beta_2$. The second helix angle $\beta_2$ is larger than the first helix angle $\beta_1$, so that the difference $\Delta\beta$ between the first helix angle $\beta_1$ and the second helix angle $\beta_2$ assumes negative values.

For the difference $\Delta\beta$, the following applies:

$$\Delta\beta = \beta_1 - \beta_2$$

In FIG. 2a), the first gear 10 is configured according to a second embodiment as a first spur gear 28 and made entirely of plastic. The first spur gear 28 also has the first toothing portion 14, within which a number of teeth 16 are located. The first toothing portion 14 has the first helix angle $\beta_1$.

In FIG. 2b), the second gear 18 is formed according to a second embodiment of the application as a second spur gear 30. The second spur gear 30 is made entirely of metal. The second spur gear 30 has the second toothing portion 22, within which a number of teeth 16 are located. The second toothing portion 22 has a second helix angle $\beta_2$.

The first spur gear 28 and the second spur gear 30 form a gear pairing 24 in which the first toothing portion 14 and the second toothing portion 22 can be brought into meshing engagement with one another in (see FIG. 4).

Not shown is a reference profile, which also has a first spur gear and a second spur gear, which form a gear pairing. In the case of the reference profile, the first helix angle $\beta_1$ and the second helix angle $\beta_2$ are equal in terms of absolute value, so that they both form a reference helix angle $\beta_r$ of the same absolute value. It should be noted that in spur gears, the two helix angles $\beta_1$, $\beta_2$ have opposite signs, so that the corresponding gear pairing 24 includes a left-beveled gear 10 and a right-beveled gear 18.

Again, the first gear 10 corresponds to that of the reference profile so that the first helix angle $\beta_1$ is equal to the reference helix angle $\beta_r$. However, the second helix angle $\beta_2$ of the second gear 18 is larger than the first helix angle $\beta_1$, so that the difference $\Delta\beta$ between the absolute value of the first helix angle $\beta_1$ and the absolute value of the second helix angle $\beta_2$ assumes negative values.

FIG. 3 shows a helical gear unit 32 with reference to a schematic representation, which comprises helical gear 20 and worm 12. Helical gear 20 and worm 12 are in meshing engagement with one another and together form a gear pairing 24, which forms an involute toothing 26. Since the helical gear 20 is made of metal and the worm 12 is made of plastic, when engaged, material pairing metal/plastic results.

In the example shown, worm 12 is connected to a drive shaft 34 which can be rotated by a motor, not shown, about a first axis $A_1$. Helical gear 20 is formed as a spindle nut 36 having an internal thread and which is rotatable about a second axis $A_2$. By means of the internal thread, spindle nut 36 is connected to a spindle 38 with the longitudinal axis L of the spindle 38 being perpendicular to the plane of FIG. 3. Not shown is a housing in which gear pairing 24 is arranged. First axis $A_1$ and second axis $A_2$ form a shaft angle $\chi$ of 90°.

In the example shown, the helical gear 32 is particularly suitable as a seat-length adjustment in vehicles. The spindle 38 is non-rotatably mounted in the vehicle. If worm 12 is rotated via drive shaft 34 as a result of a corresponding activation of the motor, the rotation of worm 12 is transmitted to spindle nut 36 with the corresponding gear ratio. As a result, spindle nut 36 and the entire helical gear unit 32 move along longitudinal axis L of spindle 38. This movement is used for the longitudinal adjustment of the seat in question.

FIG. 4 shows a spur gear 40 with reference to a schematic representation, which comprises the first spur gear 28 and the second spur gear 30. The first spur gear 28 and the second spur gear 30 are in meshing engagement with one another and together form a gear pairing 24, which forms an involute toothing 26. Since the first spur gear 28 is made of plastic and the second spur gear 30 is made of metal, when engaged, a material pairing metal/plastic results.

The first spur gear 28 is connected to a drive shaft 42 and the second spur gear 30 is connected to an output shaft 44. The first spur gear 28 and the drive shaft 42 are rotatable about a first axis $A_1$. The second spur gear 30 and the output shaft 44 are rotatable about a second axis $A_2$. Spur gear unit 40 comprises a housing 46 in which drive shaft 42 and output shaft 44 are supported in a manner not shown in detail. The first axis $A_1$ and the second axis $A_2$ are parallel to one another, so that the shaft angle $\chi$ is 0° and therefore is not marked.

In the following, the relationships of the major quantities of involute toothings 26 are listed. The most important quantities are:

$d_0$ pitch diameter (mm)
$d_a$ tip diameter (mm)
$d_f$ root diameter (mm)
e gap width (mm)
h tooth height (mm)
$h_a$ addendum factor
$h_f$ dedendum factor
$m_n$ normal module (mm)
p pitch (mm)
$s_n$ normal tooth thickness (mm)
x profile modification factor (-)
z number of teeth (-)
$\alpha_n$ normal pressure angle (°)
$\beta$ helix angle (°)

These quantities are related to one another as follows:

The following relationships apply to the pitch diameter $d_0$:

$$d_0 = z \frac{m_n}{\cos\beta}$$

The following relationships apply to the root diameter $d_f$:

$$d_f = d_0 - 2*m_n*h_f + 2*x*m_n$$

For the tip diameter, the following applies:

$$d_a = d_0 + 2*m_n*h_a + 2*x*m_n$$

For the normal module, the following applies:

$$m_n = \frac{p}{\pi} = \frac{s+e}{\pi} \approx \frac{2s}{\pi}$$

For the tooth height h, the following applies:

$$h = 2.25 * m_n$$

Table 1 shows a comparison of the essential values of the proposed involute toothing 26 compared to a reference profile for a helical gear unit 32 produced in series by the applicant and thus known, based on two exemplary embodiments, wherein worm 12 is made of plastic and helical gear 20 is made of metal and together form gear pairing 24. In all cases, the helical gear units have a shaft angle $\chi$ of 90°.

From Table 1 it can be seen that, in the reference profile, the first helix angle $\beta_1$ of the worm is equal to the second helix angle $\beta_2$ of the helical gear. In the first exemplary embodiment, worm 12 corresponds to the worm of the reference profile, so that the first helix angle $\beta_1$ corresponds to the reference helix angle $\beta_r$. Compared to the first helix angle $\beta_1$ the second helix angle $\beta_2$ of helical gear 20 is increased by a correction value K of about 3°.

In the second exemplary embodiment, helical gear 20 corresponds to the helical gear of the reference profile, so that the second helix angle $\beta_2$ corresponds to the reference helix angle $\beta_r$. Compared to the second helix angle $\beta_2$, the first helix angle $\beta_1$ of worm 12 is reduced by a correction value K of about 3°.

TABLE 1

Comparison of helical gear units (shaft angle χ = 90°)

|  | Reference profile | | First exemplary embodiment | | Second exemplary embodiment | |
| --- | --- | --- | --- | --- | --- | --- |
|  | Worm | Helical gear | Worm | Helical gear | Worm | Helical gear |
| Number of teeth z | 2 | 13 | 2 | 13 | 2 | 13 |
| Helix angle β [°] | 12.6608 | 12.6608 | 12.6608 | 15.6631 | 9.6584 | 12.6608 |
| Normal pressure angle $α_n$ [°] | 21.0000 | 21.0000 | 21.0000 | 22.5371 | 22.2422 | 21.0000 |
| Normal module $m_n$ [mm] | 0.9800 | | 0.9800 | | 0.9800 | |
| Pitch diameter $d_0$ [mm] | 8.94 | 13.06 | 8.94 | 13.23 | 11.68 | 13.06 |
| Addendum factor $h_a$ | 1.1255 | 0.8530 | 1.1255 | 0.8621 | 1.0588 | 0.8530 |
| Dedendum factor $h_f$ | 1.2214 | 1.2400 | 1.2214 | 1.2309 | 1.2882 | 1.2400 |
| Profile modification factor x | −0.3053 | 0.1647 | −0.3053 | 0.0669 | −1.6365 | 0.1647 |
| Tip diameter $d_a$ [mm] | 10.550 | 15.052 | 10.550 | 15.052 | 10.550 | 15.052 |
| Root diameter $d_f$ [mm] | 5.950 | 10.950 | 5.950 | 10.950 | 5.950 | 10.950 |

Table 2 shows a comparison of the essential values of the proposed involute toothing 26 compared to a reference profile for a spur gear unit 40 produced in series by the applicant and thus known, based on one exemplary embodiment, wherein the first spur gear 28 is made of metal and the second spur gear 30 is made of plastic and together form a gear pairing 24. As defined, the first helix angle $β_1$ is associated with the toothing portion made of plastic, and the second helix angle $β_2$ is associated with the toothing portion made of metal. In this respect, in Table 2, the first spur gear 28 has the second helix angle $β_2$, and the second spur gear 30 has the first helix angle $β_1$.

From Table 2 it can be seen that, in the reference profile, the first helix angle $β_1$ of the second spur gear is equal to the second helix angle $β_2$ of the first spur gear. In the first exemplary embodiment, the first spur gear 28 made of metal corresponds to the first spur gear of the reference profile, so that the second helix angle $β_2$ corresponds to the reference helix angle $β_r$. Compared to the second helix angle $β_2$ of the first spur gear 28 made of metal, the first helix angle $β_1$ of the second spur gear 30 made of plastic is increased by a correction value K of 1°.

TABLE 2

Comparison of spur gear units (shaft angle χ = 0°)

|  | Reference profile | | First exemplary embodiment | |
| --- | --- | --- | --- | --- |
|  | First spur gear | Second spur gear | First spur gear | Second spur gear |
| Number of teeth z | 36 | 36 | 36 | 36 |
| Helix angle β [°] | 23.0000 | 23.0000 | 23.0000 | 24.0000 |
| Normal pressure angle $α_n$ [°] | 20.0000 | 20.0000 | 20.0000 | 20.8619 |
| Normal module $m_n$ [mm] | 1.4600 | | 1.4600 | |
| Pitch diameter $d_0$ [mm] | 57.10 | 57.10 | 57.10 | 57.53 |
| Addendum factor $h_a$ | 1.0300 | 1.0300 | 1.0300 | 1.0235 |
| Dedendum factor $h_f$ | 1.2200 | 1.2200 | 1.2200 | 1.2265 |
| Profile modification factor x | −0.3000 | −0.0700 | −0.3000 | −0.2125 |

TABLE 2-continued

Comparison of spur gear units (shaft angle χ = 0°)

|  | Reference profile | | First exemplary embodiment | |
| --- | --- | --- | --- | --- |
|  | First spur gear | Second spur gear | First spur gear | Second spur gear |
| Tip diameter $d_a$ [mm] | 59.231 | 59.902 | 59.231 | 59.902 |
| Root diameter $d_f$ [mm] | 52.661 | 53.332 | 52.661 | 53.332 |

LIST OF REFERENCE NUMERALS 10 first gear
12 worm
14 first toothing portion
16 teeth
18 second gear
20 helical gear
22 second toothing portion
24 gear pairing
26 involute toothing
28 first spur gear
30 second spur gear
32 helical gear unit
34 drive shaft
36 spindle nut
38 spindle
40 spur gear unit
42 drive shaft
44 output shaft
46 housing
$β_1$ first helix angle
$β_2$ second helix angle
$β_r$ reference helix angle
$A_1$ first axis
$A_2$ second axis
K correction value
L longitudinal axis

What is claimed:

1. A gear pairing for a helical gear unit, comprising:
a first gear having a first toothing portion within which a number of first teeth are located and a first axis and wherein the first teeth have a front side and a back side;
a second gear having a second toothing portion within which a number of second teeth are located and a second axis, wherein the first axis and the second axis enclose a shaft angle ($\chi$) that is 90°;
wherein the first teeth and the second teeth meshingly engage at only a single contact point located either on the front side or the back side of the first teeth such that a backlash is formed, the first teeth and the second teeth forming an involute toothing when engaged;
wherein the first toothing portion is formed of a material selected from the group consisting of plastic or metal, and the second toothing portion is formed of the material selected from the group consisting of plastic or metal and which is different than the material of the first toothing portion such that when the first toothing portion and the second toothing portion meshingly engage, a material pairing of metal/plastic results, and
wherein the toothing portion formed of plastic consists of a single plastic helix angle ($\beta_1$) and the toothing portion formed of metal consists of a single metal helix angle ($\beta_2$),
wherein a difference ($\Delta\beta$) between an absolute value of the plastic helix angle ($|\beta_1|$) and an absolute value of the metal helix angle ($|\beta_2|$)
is for the helical gear unit with the shaft angle ($\chi$) of 90°: $\Delta\beta=|\beta_1|-|\beta_2|=90°-\chi\pm K\neq 90°-\chi$,
wherein $0.5°\leq K\leq 5°$.

2. The gear pairing for the helical gear unit according to claim 1,
wherein a reference profile has a reference helix angle ($\beta_r$),
wherein the plastic helix angle ($\beta_1$) is different from the reference helix angle ($\beta_r$), the metal helix angle ($\beta_2$) is different from the reference helix angle ($\beta_r$) or both the plastic helix angle ($\beta_1$) is different from the reference helix angle ($\beta_r$) and the metal helix angle ($\beta_2$) is different from the reference helix angle ($\beta_r$), the reference profile being defined as follows:

| | Reference profile 1 | |
|---|---|---|
| | Worm | Helical gear |
| Number of teeth z | 2 | 13 |
| Helix angle $\beta_r$ [°] | 12.6608 | 12.6608 |
| Normal pressure angle $\alpha]_n$ [°] | 21.0000 | 21.0000 |
| Normal module $m_n$ [mm] | 0.9800 | |
| Pitch diameter $d_0$ [mm] | 8.94 | 13.06 |
| Addendum factor $h_a$ | 1.1255 | 0.8530 |
| Dedendum factor $h_f$ | 1.2214 | 1.2400 |
| Profile modification factor x | −0.3053 | 0.1647 |
| Tip diameter $d_a$ [mm] | 10.550 | 15.052 |
| Root diameter $d_f$ [mm] | 5.950 | 10.950 |

3. The gear pairing for the helical gear unit according to claim 1,
wherein the first gear is formed as a worm gear and the second gear is formed as a helical gear and the helical gear or the worm are connected to a drive shaft;
wherein the first toothing portion of the worm and the second toothing portion of the helical gear are meshingly engaged.

4. The gear pairing for the helical gear unit according to claim 3, wherein the helical gear is made of metal, is formed as a spindle nut and interacts with a spindle, and wherein the worm is made of plastic.

5. The gear pairing for the helical gear unit according to claim 3, wherein $1°\leq K\leq 3°$.

6. A gear pairing for a helical gear unit, comprising:
a first gear having metal teeth and a first axis and wherein the metal teeth have a front side and a back side;
a second gear having plastic teeth and a second axis, wherein the first axis and the second axis enclose a shaft angle ($\chi$) that is between 0° and 90°;
wherein the metal teeth and the plastic teeth meshingly engage at only a single contact point located either on the front side or the back side of the first teeth such that a backlash is formed, the first teeth and the second teeth forming an involute toothing when engaged;
wherein the metal teeth and the plastic teeth meshingly engage to a metal to plastic pairing;
wherein the plastic teeth consists of a single plastic helix angle ($\beta_1$) and the metal teeth consists of a single metal helix angle ($\beta_2$),
wherein a difference ($\Delta\beta$) between an absolute value of the plastic helix angle ($|\beta_1|$) and an absolute value of the metal helix angle ($|\beta_2|$)
is for the helical gear unit with the shaft angle ($\chi$) of 45 to 90°: $=|\beta_1|-|\beta_2|=90°-\chi\pm K\neq 90°-\chi$, and
is for the helical gear unit with the shaft angle ($\chi$) of 0 to 45°: $\Delta\beta=|\beta_1|-|\beta_2|=-\chi\pm K\neq 0°-\chi$,
wherein $0.5°\leq K\leq 5°$,
wherein a reference profile has a reference helix angle ($\beta_r$),
wherein the plastic helix angle ($\beta_1$) is different from the reference helix angle ($\beta_r$), and wherein the metal helix angle ($\beta_2$) comprises the reference helix angle ($\beta_r$)

| | Reference profile 1 | |
|---|---|---|
| | Worm | Helical gear |
| Number of teeth z | 2 | 13 |
| Helix angle $\beta_r$ [°] | 12.6608 | 12.6608 |
| Normal pressure angle $\alpha]_n$ [°] | 21.0000 | 21.0000 |
| Normal module $m_n$ [mm] | 0.9800 | |
| Pitch diameter $d_0$ [mm] | 8.94 | 13.06 |
| Addendum factor $h_a$ | 1.1255 | 0.8530 |
| Dedendum factor $h_f$ | 1.2214 | 1.2400 |
| Profile modification factor x | −0.3053 | 0.1647 |
| Tip diameter $d_a$ [mm] | 10.550 | 15.052 |
| Root diameter $d_f$ [mm] | 5.950 | 10.950 |

\* \* \* \* \*